(12) United States Patent
Kim

(10) Patent No.: US 10,535,846 B2
(45) Date of Patent: Jan. 14, 2020

(54) SECONDARY BATTERY

(71) Applicant: Samsung SDI Co., Ltd., Yongin-si, Gyeonggi-do (KR)

(72) Inventor: Dukjung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 251 days.

(21) Appl. No.: 14/662,183

(22) Filed: Mar. 18, 2015

(65) Prior Publication Data

US 2015/0364732 A1    Dec. 17, 2015

(30) Foreign Application Priority Data

Jun. 17, 2014    (KR) ........................ 10-2014-0073644

(51) Int. Cl.
*H01M 2/08*    (2006.01)

(52) U.S. Cl.
CPC .................................... *H01M 2/08* (2013.01)

(58) Field of Classification Search
CPC .... H01M 2/08; H01M 2/0217; H01M 2/0491; H01M 2/0277; H01M 2/0482; H01M 2/0275
See application file for complete search history.

(56) References Cited

U.S. PATENT DOCUMENTS

| | | | |
|---|---|---|---|
| 3,736,190 A | 5/1973 | Dey et al. | |
| 5,744,261 A * | 4/1998 | Muffoletto | H01M 2/021 429/131 |
| 7,294,433 B2 * | 11/2007 | Murashige | H01M 2/266 429/153 |
| 2003/0082439 A1 * | 5/2003 | Sakakibara | H01M 2/0202 429/120 |
| 2007/0141452 A1 * | 6/2007 | Kim | H01M 2/0202 429/120 |
| 2007/0154785 A1 | 7/2007 | Seo et al. | |
| 2008/0096105 A1 * | 4/2008 | Lee | H01M 2/0215 429/163 |
| 2011/0052975 A1 | 3/2011 | Lee | |

(Continued)

FOREIGN PATENT DOCUMENTS

| | | |
|---|---|---|
| CN | 103081162 A | 5/2013 |
| JP | 2002-33084 | 1/2002 |

(Continued)

OTHER PUBLICATIONS

Extended European Search Report issued in corresponding European Application No. 15166571.8-1360 dated Oct. 21, 2015, 9 pages.

(Continued)

*Primary Examiner* — Maria Laios
*Assistant Examiner* — Angela J Martin
(74) *Attorney, Agent, or Firm* — Lewis Roca Rothgerber Christie LLP

(57) ABSTRACT

A secondary battery having reinforced stability and durability is provided. The secondary battery includes a case having an opening; an electrode assembly in the case with an electrolyte, a cap plate sealing the opening of the case, a terminal assembly electrically connected to the electrode assembly and protruding through the cap plate, and an insulation bag between the electrode assembly and the case to receive the electrode assembly and to hermetically seal the electrolyte.

14 Claims, 12 Drawing Sheets

(56) References Cited

U.S. PATENT DOCUMENTS

| | | | |
|---|---|---|---|
| 2011/0086265 A1 | 4/2011 | Suzuki | |
| 2011/0183181 A1* | 7/2011 | Moon | H01M 2/0237 |
| | | | 429/136 |
| 2012/0052365 A1* | 3/2012 | Chang | H01M 2/08 |
| | | | 429/158 |
| 2012/0088147 A1 | 4/2012 | Moon | |
| 2012/0156531 A1 | 6/2012 | Guen | |
| 2012/0171525 A1 | 7/2012 | Guen | |
| 2013/0029192 A1* | 1/2013 | Oya | H01M 2/1072 |
| | | | 429/61 |
| 2013/0052510 A1* | 2/2013 | Miyazaki | H01M 2/08 |
| | | | 429/156 |
| 2013/0157143 A1* | 6/2013 | Hoshiba | H01M 4/621 |
| | | | 429/304 |
| 2015/0092343 A1* | 4/2015 | Rich | H01G 11/10 |
| | | | 361/679.54 |

FOREIGN PATENT DOCUMENTS

| | | |
|---|---|---|
| JP | 2013-251119 A | 12/2013 |
| KR | 10-2011-0025036 A | 3/2011 |
| KR | 10-1036089 B1 | 5/2011 |
| KR | 10-2012-0075849 A | 7/2012 |

OTHER PUBLICATIONS

Chinese Office Action dated Sep. 18, 2018, for corresponding Chinese Patent Application No. 201510211920.2 (7 pages).

* cited by examiner

SECONDARY BATTERY

CROSS-REFERENCE TO RELATED APPLICATION

This application claims priority to and the benefit of Korean Patent Application No. 10-2014-0073644, filed on Jun. 17, 2014, the entire content of which is incorporated herein by reference.

BACKGROUND

1. Field

Embodiments of the present invention relate to a secondary battery having reinforced stability and durability.

2. Description of the Related Art

In general, secondary batteries can be discharged and recharged, unlike primary batteries, which are not designed to be recharged. Secondary batteries may be of a low capacity type, which includes battery cells in the form of a pack typically used for small portable electronic devices such as cellular phones and camcorders, or a high capacity type, which includes battery cells used as a motor-driving power source and having several battery cells connected to one another and widely used as a power source for hybrid vehicles, etc.

Secondary batteries may be manufactured in various shapes, such as a cylindrical shape or prismatic shapes. A typical secondary battery may include an electrode assembly, which is formed by interposing a separator serving as an insulator between positive and negative electrodes, and an electrolyte solution housed in a case, and a cap plate installed in the case. Positive and negative electrode terminals are connected to the electrode assembly and then exposed or protruded to the outside through the cap plate.

In order to prevent the electrode assembly from being brought into contact with the case when the electrode assembly is inserted into the case, the electrode assembly may be surrounded by an insulation tape. However, it is quite difficult for the insulation tape to perfectly surround the uncoated portion of the electrode assembly. In addition, some portions of the electrode assembly may not be perfectly insulated due to non-uniformity of the insulation tape. In such a case, corrosion of the battery case may be caused due to current leakage or a high-voltage arc may be generated, thereby compromising the safety of the secondary battery.

SUMMARY

Embodiments of the present invention provide a secondary battery having reinforced stability and durability.

In accordance with one embodiment of the present invention, there is provided a secondary battery including a case having an opening; an electrode assembly in the case with an electrolyte, a cap plate sealing the opening of the case, a terminal assembly electrically connected to the electrode assembly and protruding through the cap plate, and an insulation bag between the electrode assembly and the case to receive the electrode assembly and to hermetically seal the electrolyte.

The insulation bag may be coupled to a bottom surface of the cap plate.

The insulation bag may be coupled to a bottom surface of the cap plate by at least one of thermal compression, chemical bonding and use of an adhesion member.

The insulation bag may include at least one of polyethylene (PE), polypropylene (PP) and polyethylene terephthalate (PET) or a combination thereof.

Hermetically sealing the electrolyte in the insulation bag may prevent the electrolyte from being brought into contact with the case.

The insulation bag may receive a region of the terminal assembly exposed to a bottom surface of the cap plate and seal an exposed region.

The secondary battery may further include an insulation layer between an inner wall of the case and the insulation bag.

The insulation layer may be an air layer.

The insulation bag may be shaped as a hexahedron having an open top.

The insulation bag may further include a flange horizontally extending from an inner wall of the open top.

The insulation bag may have an open top and a lower region protruding downwardly.

The cap plate may further include a coating layer on its bottom surface, wherein the coating layer is made of an insulating material.

The coating layer may be adhered to the insulation bag to achieve coupling.

The coating layer and the insulation bag may be made of a same material.

The coating layer may include at least one of polyethylene (PE), polypropylene (PP) and polyethylene terephthalate (PET) or a combination thereof.

The secondary battery may further include a current collector tab protruding to one side of the electrode assembly, wherein the terminal assembly is coupled to the current collector tab.

The current collector tab may include a plurality of current collector tabs protruding from the inside of the electrode assembly and positions of the respective protruding current collector tabs are aligned.

The current collector tab may be integral with the electrode assembly or may be coupled to the electrode assembly by a separate member.

As described above, the secondary battery according to an embodiment of the present invention includes an insulation bag surrounding an electrode assembly and a terminal assembly and an air layer formed by inserting the insulation bag into a case in a state in which a top portion of the insulation bag is adhered to a cap plate, and allows an electrolyte to be housed only inside the insulation bag to prevent an electric short-circuit between the electrode assembly or the terminal assembly and the case due to a contact therebetween, thereby reinforcing the stability and durability of the secondary battery.

Additional aspects and/or advantages of the present invention will be set forth in part in the description of example embodiments which follows and, in part, will be obvious from the description, or may be learned by practice of embodiments of the present invention.

BRIEF DESCRIPTION OF THE DRAWINGS

The features and aspects of embodiments of the present invention will be more apparent from the following detailed description in conjunction with the accompanying drawings, in which.

DETAILED DESCRIPTION

Hereinafter, examples of embodiments of the invention will be described in detail with reference to the accompanying drawings such that they can easily be made and used by those skilled in the art.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

Expressions such as "at least one of," when preceding a list of elements, modify the entire list of elements and do not modify the individual elements of the list. Further, the use of "may" when describing embodiments of the present invention refers to "one or more embodiments of the present invention."

Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
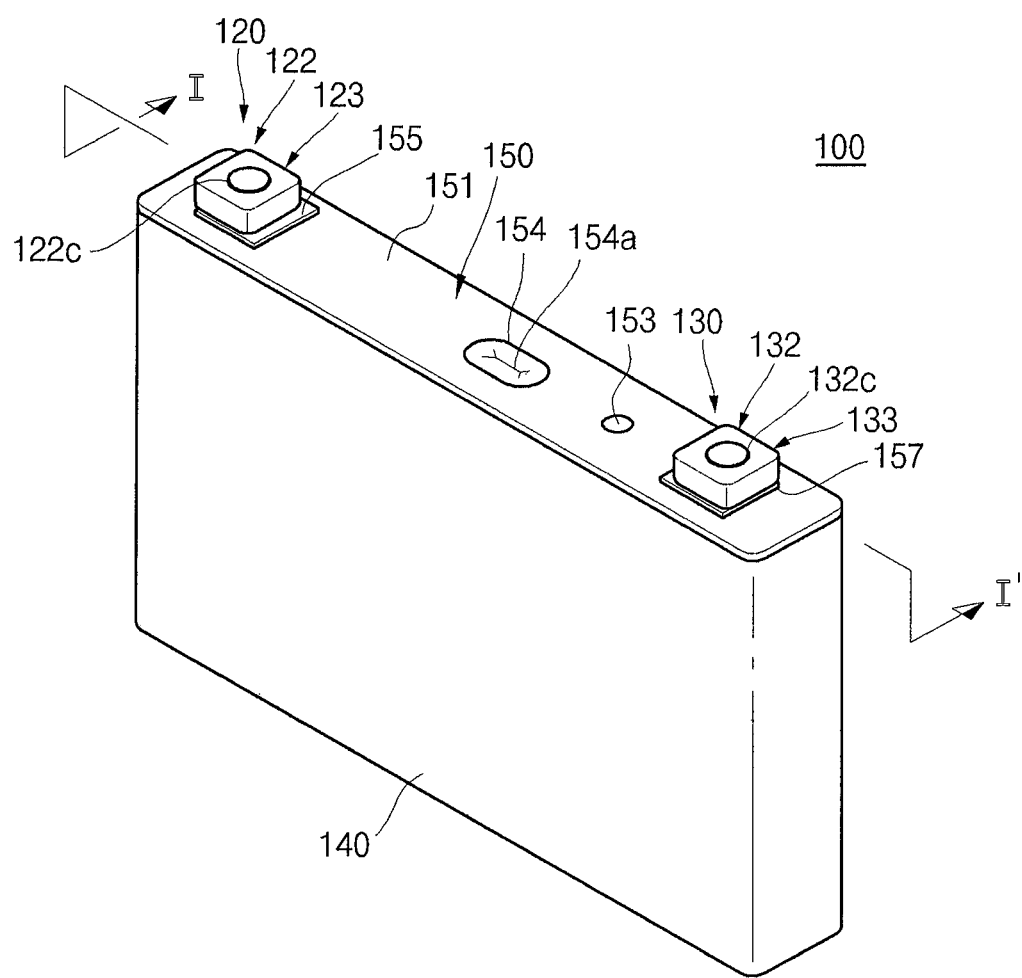
FIG. 1 is a perspective view of a secondary battery according to an embodiment of the present invention.
Figure 2:
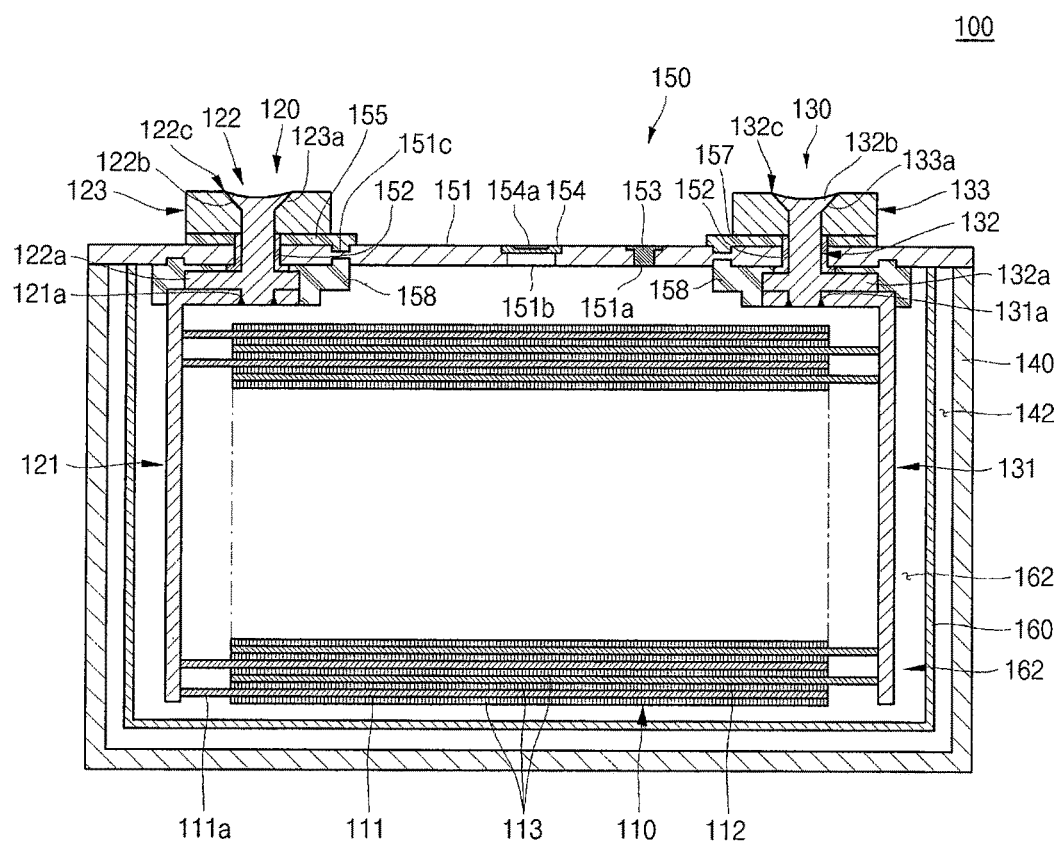
FIG. 2 is a cross-sectional view taken along the line I-I' of FIG. 1.
Figure 3:
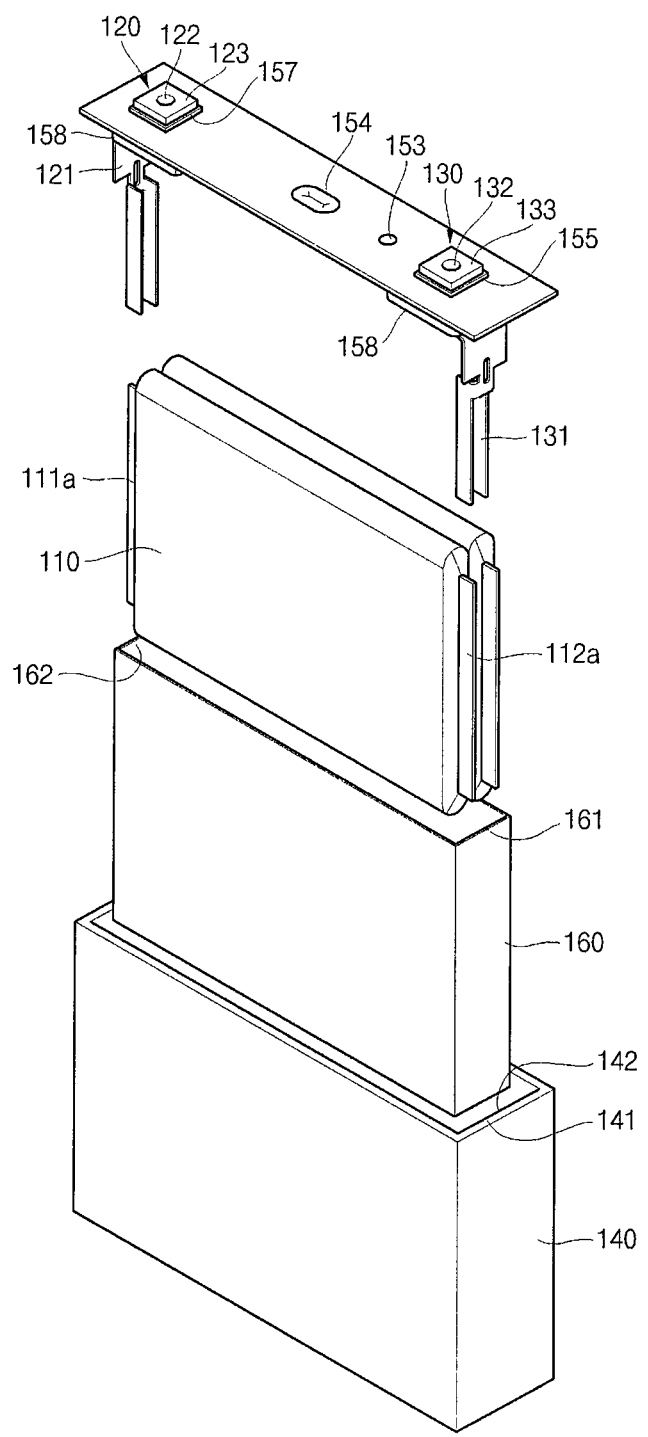
FIG. 3 is an exploded perspective view of a secondary battery according to an embodiment of the present invention.
Figure 4:
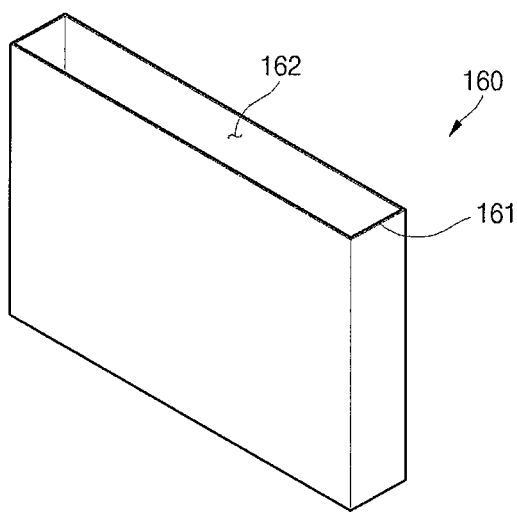
FIG. 4 is a perspective view illustrating an insulation bag of a secondary battery according to an embodiment of the present invention.

FIG. 1 is a perspective view of a secondary battery according to an embodiment of the present invention, FIG. 2 is a cross-sectional view taken along the line I-I' of FIG. 1, FIG. 3 is an exploded perspective view of a secondary battery according to an embodiment of the present invention, and FIG. 4 is a perspective view illustrating an insulation bag of a secondary battery according to an embodiment of the present invention.

Referring to FIGS. 1 to 4, the secondary battery 100 according to an embodiment of the present invention includes an electrode assembly 110, a first terminal assembly 120, a second terminal assembly 130, a case 140, a cap assembly 150, and an insulation bag 160.

The electrode assembly 110 according to this embodiment has a wound or laminated stacked structure including a first electrode plate 111, a separator 113, and a second electrode plate 112, and may have a thin plate or a thin foil shape. In this embodiment, the first electrode plate 111 may be a positive electrode and the second electrode plate 112 may be a negative electrode, but embodiments of the present invention is not limited to this embodiment. In other embodiments, polarities of the first and second electrode plates 111 and 112 may differ from what is described above.

The first electrode plate 111 may include a first electrode collector formed of a metal foil made of, for example, aluminum (Al), and a first electrode active material, such as, a transition metal oxide, on the first electrode collector. In addition, the first electrode plate 111 may include a first electrode uncoated portion 111a where the first electrode active material is not applied. The first electrode uncoated portion 111a may function as a passage for current flowing between the first electrode plate 111 and an exterior of the first electrode plate 111. Embodiments of the present invention are not limited to the material of the first electrode plate 111 listed herein.

The second electrode plate 112 may include a second electrode collector formed of a metal foil made of, for example, copper (Cu) or nickel (Ni), and a second electrode active material, such as, graphite or carbon, on the second electrode collector. In addition, the second electrode plate 112 may include a second electrode uncoated portion 112a where the second electrode active material is not applied. The second electrode uncoated portion 112a may function as a passage for current flowing between the second electrode plate 112 and an exterior of the second electrode plate 112. Embodiments of the present invention are not limited to the material of the second electrode plate 112 listed herein.

The separator 113 may be positioned between the first electrode plate 111 and the second electrode plate 112 to prevent or substantially prevent electrical short circuits and to allow movement of lithium ions. The separator 113 according to this embodiment may be made of a material selected from the group consisting of polyethylene, polypropylene, a copolymer of polypropylene and polyethylene, and combinations thereof. Embodiments of the present invention are not limited to the material of the separator 113 listed herein.

A first terminal assembly 120 and a second terminal assembly 130, electrically connected to the first electrode plate 111 and the second electrode plate 112, respectively, are coupled to respective ends of the electrode assembly 110.

The electrode assembly 110 is in the case 140 with an electrolyte. The electrolyte may include an organic solvent, such as EC (ethylene carbonate), PC (propylene carbonate), DEC (diethyl carbonate), EMC (ethyl methyl carbonate), or DMC (dimethyl carbonate), and a lithium salt, such as $LiPF_6$, or $LiBF_4$. In addition, the electrolyte may be in a liquid, solid or gel phase.

The first terminal assembly 120 is made of a conductive material, such as aluminum, and is coupled to the first electrode plate 111. The first collector plate 121 includes a first collector plate 121, a first collector terminal 122 and a first terminal plate 123.

The first collector plate 121 is brought into contact with the first electrode uncoated portion 111a protruding to one end of the electrode assembly 110 to then be coupled thereto. The first collector plate 121 may be coupled to the first electrode uncoated portion 111a by welding. The first collector plate 121 includes a vertical region formed along the first electrode uncoated portion 111a and a horizontal region maintained at approximately (or about) 90 degrees with respect to the vertical region, and a terminal hole 121a is formed in the horizontal region. A portion of the first collector terminal 122 is inserted into the terminal hole 121a and coupled thereto. The first collector plate 121 may be made of aluminum or an aluminum alloy. However, embodiments of the present invention are not limited to the material of the first collector plate 121 listed herein.

The first collector terminal 122 penetrates through the cap plate 151 and upwardly protrudes and extends (e.g., extends a predetermined length). In addition, the first collector terminal 122 is electrically connected to the first collector plate 121 under the cap plate 151. Similar to the first collector plate 121, the first collector terminal 122 may be made of aluminum or an aluminum alloy, but embodiments of the present invention are not limited to the material of the first collector terminal 122 listed herein. The first collector terminal 122 includes a flange 122a horizontally extending along the first collector plate 121, a riveting part 122b upwardly protruding and coupled to the first terminal plate 123, and a coupling part 122c formed along the edge of the riveting part 122b.

The flange 122a is horizontally formed (e.g., extends horizontally) along the first collector plate 121. The flange 122a vertically protrudes from a region to then be inserted into the terminal hole 121a of the first collector plate 121. In addition, welding is performed on the periphery of the terminal hole 121a, thereby allowing the first collector terminal 122 to be coupled to the first collector plate 121.

The riveting part 122b upwardly protrudes from the flange 122a. The riveting part 122b is riveted in a state in which it penetrates through the first terminal plate 123 to mechanically, electrically couple the first collector terminal 122 to the first terminal plate 123. In addition, as the welding is performed on the edge of the riveting part 122b, the coupling part 122c is formed, thereby maintaining the coupling of the riveting part 122b in a more secure manner.

The first terminal plate 123 may be made of aluminum or an aluminum alloy. The first terminal plate 123 has an inclined surface 123a recessed from a top portion of a terminal body. When the riveting part 122b of the first collector terminal 122 is riveted, the riveting part 122b may be easily compressed along the inclined surface 123a to then be deformed, thereby increasing a coupling area through a surface contact with the riveting part 122b. Accordingly, the first terminal plate 123 may be mechanically and electrically connected to the first collector terminal 122.

As will later be described, a fastening plate 155 is formed between the first terminal plate 123 and the cap plate 150. The first terminal plate 123 and the cap plate 150 may have the same polarity, e.g., a first polarity, according to the polarity of the fastening plate 155, and the first terminal plate 123 and the cap plate 150 may be electrically insulated from each other.

The second terminal assembly 130 may be shaped to correspond to the first terminal assembly 120 to have the same shape with the first terminal assembly 120. The second terminal assembly 130 is electrically connected to the second electrode plate 112 of the electrode assembly 110. The second terminal assembly 130 may include a second collector plate 131, a second collector terminal 132 and a second terminal plate 133.

The second collector plate 131 may be made of copper or a copper alloy. However, the present invention is not limited to the material of the second collector plate 131 listed herein. The second collector plate 131 may have a roughly 'L' shape and is coupled to the second electrode plate 112 of the electrode assembly 110. In addition, the second collector plate 131 has a terminal hole 131a and the second collector terminal 132 is inserted into the terminal hole 131a, thereby allowing the second collector terminal 132 welded to the second collector plate 131.

The second collector terminal 132 is coupled to the second collector plate 131 to then protrude through a top portion of the cap plate 155, and corresponds to the first collector terminal 122, including a flange 132a, a riveting part 132b and a coupling part 132c.

The second terminal plate 133 is coupled to the second collector terminal 132 and has an inclined surface 133a to have an increased coupling force with respect to the riveting part 132b of the second collector terminal 132. The second terminal plate 133 is coupled to the cap plate 151 by a lower insulation plate 157. Therefore, the second terminal plate 133 having a second polarity may be electrically disconnected from the cap plate 151.

The case 140 may be made of a conductive metal, e.g., aluminum, an aluminum alloy, or a nickel plated steel, and may have an approximate hexahedron shape having an opening through which the electrode assembly 110, the first terminal assembly 120, the second terminal assembly 130 and the insulation bag 160 may be inserted and placed. In FIG. 2, the case 140 and the cap plate 151 assembled to each other are illustrated. Thus, the opening, which is a substantially opened part of the peripheral edge of the cap plate 151, is not illustrated in FIG. 2. In the secondary battery 100 according to an embodiment of the present invention, when the first terminal assembly 120 is electrically connected to the cap plate 151 and the case 140, the case 140 and the first terminal assembly 120 may have the same polarity, e.g., a first polarity. In addition, the interior surface of the case 140 is basically subjected to insulation treatment such that even if it is brought into contact with the second electrode uncoated portion 112a of the electrode assembly 110 or the second terminal assembly 130, having a second polarity, due to movement, it maintains electrical isolation therefrom. Therefore, it is possible to prevent or substantially prevent an electrical short-circuit from occurring at normal times.

In addition, the case 140 includes an insulation layer 142 between the insulation bag 160 inserted into the space and an inner wall. The insulation layer 142 is filled with the air having low electric conductivity. With this configuration, the insulation bag 160 and the electrode assembly 110 are inserted into the interior side of the case 140 and only the inside of the insulation bag 160 may be filled with an electrolyte is filled. Therefore, the insulation layer 142 can prevent or substantially prevent the electrode assembly 110 of the secondary battery 100 according to an embodiment of the present invention from being brought into contact with the inner wall of the case 140, thereby improving the stability and durability of the secondary battery. However, according to the option of one skilled in the art, the insulation layer 142 may also be formed by filling a member with an insulating material other than air.

In addition, even when the insulation layer 142 is provided in the secondary battery 100 according to an embodiment of the present invention, it is not necessary to separately provide an insulation tape in the electrode assembly 110, unlike in the conventional electrode assembly. Therefore, the secondary battery 100 according to an embodiment of the present invention demonstrates little reduction in the battery capacity, compared to the conventional secondary battery.

The cap assembly 150 is coupled to the case 140. In detail, the cap assembly 150 includes a cap plate 151, a fastening plate 155, a coating layer 156, and an insulation plate 157. In addition, the cap assembly 150 may further include a seal gasket 152, a plug 153, a safety vent 154, and an insulation member 158.

The cap plate 151 may seal the opening of the case 140 and may be made of the same material, or substantially the same material, as the case 140. In an exemplary embodiment, the cap plate 151 may be coupled to the case 140 by laser welding. In some cases, the cap plate 151 may be electrically connected to the first terminal assembly 120. Here, the cap plate 151 and the case 140 may have the same polarity, e.g., a first polarity.

The seal gasket 152 is between each of the first collector terminal 122 and the second collector terminal 132 and the cap plate 151 using an insulating material and seals gaps between each of the first collector terminal 122 and the second collector terminal 132 and the cap plate 151. The seal gasket 152 may prevent or substantially prevent external moisture from penetrating into the secondary battery 100 or may prevent or substantially prevent internal electrolyte contained in the secondary battery 100 from flowing out.

The plug 153 seals an electrolyte injection hole (or opening) 151a of the cap plate 151, and the safety vent 154 is installed in a vent hole (or opening) 151b of the cap plate 151 and may have a notch 154a opened at a preset pressure.

The fastening plate 155 is formed between the cap plate 151 and the first terminal plate 123. The fastening plate 155 is made of the same material with the cap plate 151, for example, aluminum or an aluminum alloy, or optionally an insulating material, but aspects of the present invention are not limited thereto.

In addition, the fastening plate 155 includes a fastening protrusion 155a, and the cap plate 151 includes a fastening groove 151c located to correspond to the fastening protrusion 155a. Therefore, when the fastening plate 155 is coupled to the cap plate 151, the fastening protrusion 155a is inserted into the fastening groove 151c to achieve the coupling. Therefore, the fastening plate 155 can be coupled to the cap plate 151 in a secure manner, and it is possible to prevent or substantially prevent the fastening plate 155 from moving during the manufacture or use.

The insulation plate 157 is formed between the second terminal plate 133 and the cap plate 151. The insulation plate 157 may be shaped to correspond to the fastening plate 155. However, the insulation plate 157 is made of an electrically insulating material to make the second terminal plate 133 having a second polarity electrically disconnected from the cap plate 151, thereby preventing or substantially preventing an electric short-circuit from occurring between electrodes.

The insulation member 158 is closely adhered to the cap plate 151. In addition, the insulation member 158 is also closely adhered to the seal gasket 152. The insulation member 158 allows the first terminal plate 123 and the second terminal plate 133 to be closely adhered to the cap plate 151 to then be coupled thereto. In addition, the insulation member 158, between the second collector plate 131 and the cap plate 151 and between the case 140 and the second collector plate 131, prevents or substantially prevents unnecessary electric shorts from occurring.

The insulation bag 160 has a shape of a hexahedron having an open top to receive the electrode assembly 110, but the present invention does not limit the shape of the insulation bag 160 to that illustrated herein, so long as it has a shape capable of or suitable for receiving the electrode assembly 110. The insulation bag 160 encloses the electrode assembly 110 to prevent or substantially prevent the electrode assembly 110 from contacting the case 140, thereby preventing or substantially preventing an electrical short therebetween.

In more detail, the open top of the insulation bag 160 is adhered to the bottom surface of the cap plate 151 to have a sealed space 162 inside an inner wall 161 of the insulation bag 160, and the electrode assembly 110 is in the space 162 together with the electrolyte. In addition, the insulation bag 160 receives the terminal assemblies 120 and 130 and seals regions of the terminal assemblies 120 and 130 extending below a bottom portion of the cap plate 151. In such a manner, the secondary battery 100 according to an embodiment of the present invention performs charging and discharging using the electrode assembly 110.

The insulation bag 160 is made of an insulating material that is not reactive with the electrolyte. To this end, the insulation bag 160 may include at least one of polyethylene (PE), polypropylene (PP), polyethylene terephthalate (PET), or a combination thereof. The insulation bag 160 having a roughly hexahedral shape to receive the electrode assembly 110 may be formed by blowing. Accordingly, the insulation bag 160 has a shape similar to that of the cap plate 151 in a state in which its top is opened. However, the opening of the insulation bag 160 has a slightly smaller area than the cap plate 151 and is coupled to the bottom surface of the cap plate 151 assembled with all of the electrode assembly 110 and the terminal assemblies 120 and 130. The insulation bag 160 receives all of the electrode assembly 110, the collector plates 121 and 131 of the terminal assemblies 120 and 130, the collector terminals 122 and 132 and the insulation member 158 and, is assembled with the cap plate 151.

Here, the insulation bag 160 may be adhered to the bottom surface of the cap plate 150 by thermal compression. The thermal compression allows the insulation bag 160 and the cap plate 151 to be adhered to each other without a separate adhesion member provided therebetween. In other embodiments, the insulation bag 160 and the cap plate 151 may be adhered to each other using a chemical bonding method or a separate adhesion member.

The insulation bag 160 is inserted into the case 140 in a state in which it is coupled to the cap plate 151. Accordingly, the insulation layer 142 is formed between the insulation bag 160 and the inner wall of the case 140.

In such a state, the electrolyte is injected into the insulation bag 160 through the electrolyte injection hole 151a of the cap plate 151 of the cap plate 151. Therefore, the electrode assembly 110 may be impregnated into the electrolyte and the electrolyte may not leak to the outside of the insulation bag 160, thereby preventing or substantially preventing the electrolyte from making direct contact with the case 140. In addition, it is also possible to prevent or substantially prevent the electrolyte from making direct contact with the case 140 due to movement of the electrode assembly 110 or the terminal assemblies 120 and 130. Therefore, even when the case 140 happens to have any region that is not insulated, it is possible to prevent or substantially prevent the case 140 from corroding due to the electrolyte. Accordingly, the secondary battery 100 according to an embodiment of the present invention may have reinforced stability and durability by preventing or substantially preventing corrosion of the case 140 and a risk of arc generated due to the corrosion of the case 140.

Hereinafter, a secondary battery according to another embodiment of the present invention will be described.

Figure 5A:
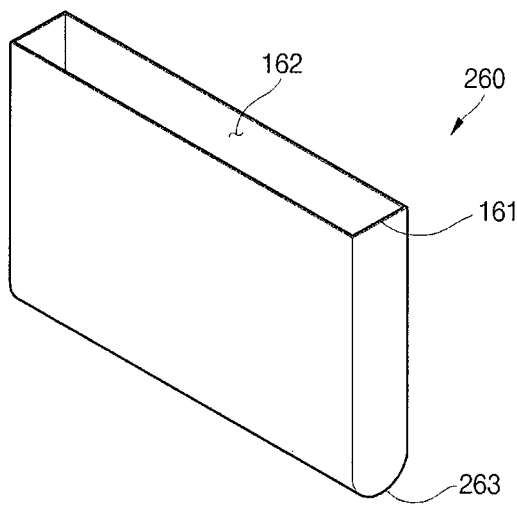
FIG. 5A is a perspective view illustrating an insulation bag of a secondary battery according to another embodiment of the present invention.
Figure 5B:
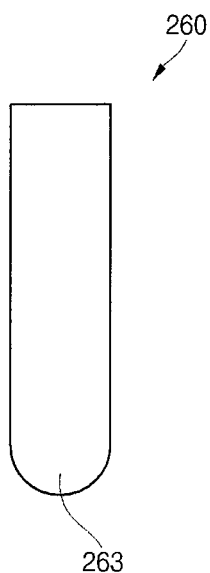
FIG. 5B is a side view illustrating the insulation bag shown in FIG. 5A.

FIG. 5A is a perspective view illustrating an insulation bag of a secondary battery according to another embodiment of the present invention and FIG. 5B is a side view illustrating the insulation bag shown in FIG. 5A.

Referring to FIGS. 5A and 5B, in the secondary battery 200 according to another embodiment of the present invention, an insulation bag 260 has a downwardly convex lower region 263. The insulation bag 260 is shaped to correspond to the electrode assembly 110, and a sufficient amount of electrolyte can be accommodated in a space between the lower region 263 and the electrode assembly 110. Thus, the electrode assembly 110 can be sufficiently impregnated (e.g., immersed) into the electrolyte, and the secondary battery 200 according to another embodiment of the present invention may exhibit improved electrical properties, including charging and discharging capacities.

Hereinafter, a secondary battery according to still another embodiment of the present invention will be described.

Figure 6:
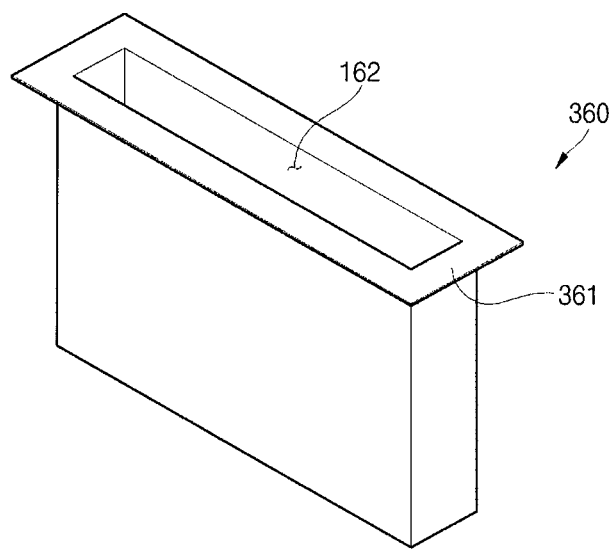
FIG. 6 is a perspective view illustrating an insulation bag of a secondary battery according to still another embodiment of the present invention.

FIG. 6 is a perspective view illustrating an insulation bag of a secondary battery according to still another embodiment of the present invention.

Referring to FIG. 6, in the secondary battery 300 according to still another embodiment of the present invention, an insulation bag 360 may further include a flange 361 formed on an open top, the flange 361 horizontally extending from an inner wall 161. The flange 361 extends from a top portion of the insulation bag 360 and has an increased contact area when it is coupled to the cap plate 151. Accordingly, the insulation bag 360 can be coupled to the cap plate 151 in a secure manner and provides a space for an assembling work when thermal compression is employed, thereby reducing the time required for the manufacturing process.

Hereinafter, a secondary battery according to still another embodiment of the present invention will be described.

Figure 7:
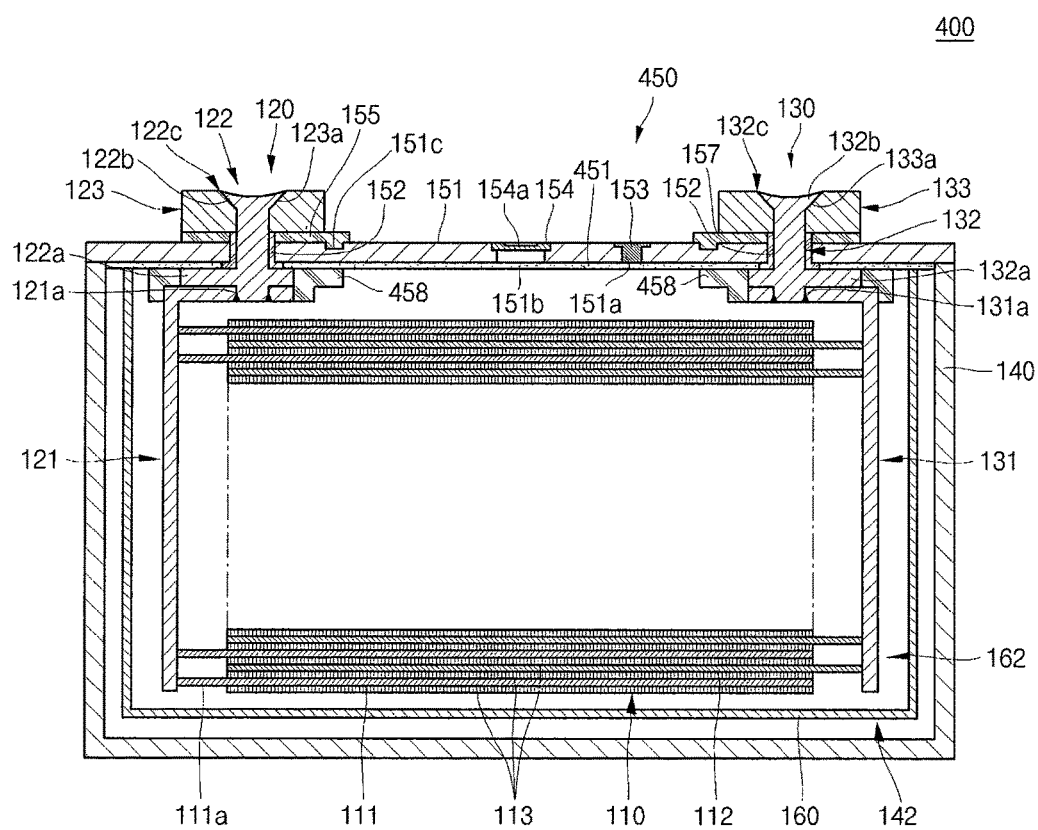
FIG. 7 is a cross-sectional view of a secondary battery according to still another embodiment of the present invention.

FIG. 7 is a cross-sectional view of a secondary battery according to still another embodiment of the present invention.

Referring to FIG. 7, the secondary battery 400 according to still another embodiment of the present invention includes an electrode assembly 110, a first terminal assembly 120, a second terminal assembly 130, a case 140, a cap assembly 450 and an insulation bag 160.

The cap assembly 450 further includes a coating layer 451 formed on a bottom surface of the cap plate 151. The coating layer 451 may be made of the same material with the insulation bag 160. That is to say, the coating layer 451, the electrode assembly 110 and the coating layer 451 may be formed through a region of the bottom surface of the cap plate 151, except for a potential region of the seal gasket 152, and is made of the same material with the insulation bag 160, thereby increasing a coupling force when it is coupled to the insulation bag 160. Therefore, the insulation bag 160 may maintain a securely coupled state in which the coating layer 451 is coupled to the bottom surface of the cap plate 151.

Hereinafter, a secondary battery according to still another embodiment of the present invention will be described.

Figure 8:
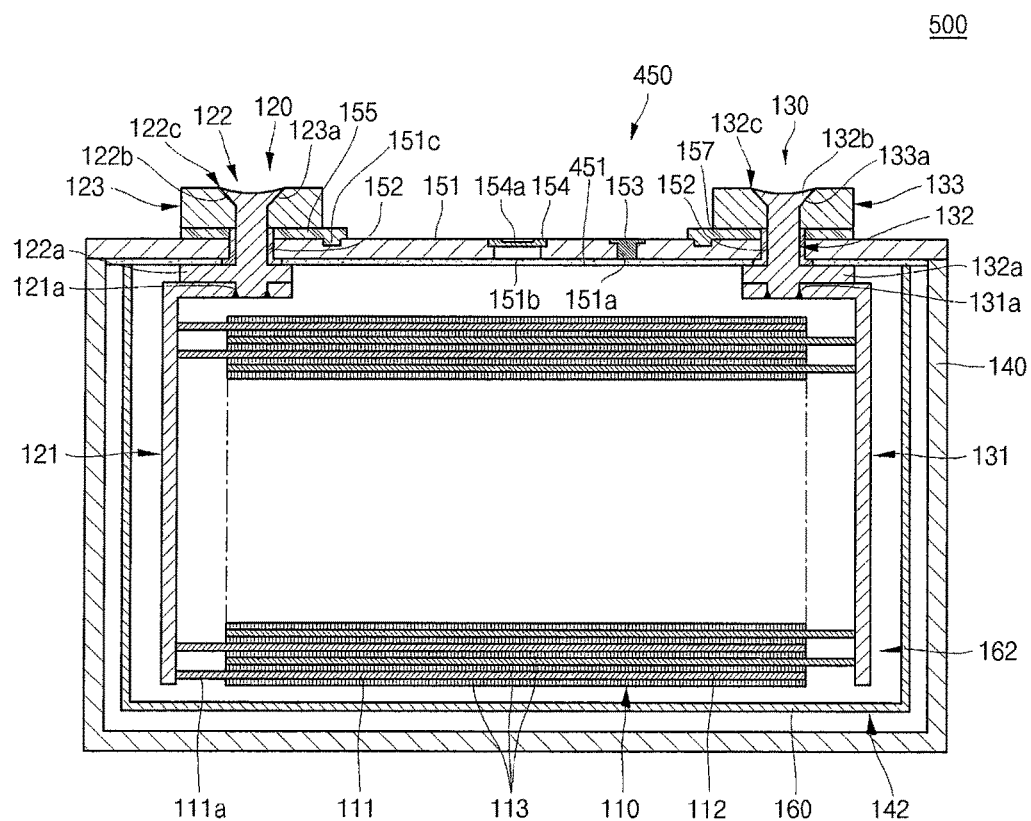
FIG. 8 is a cross-sectional view of a secondary battery according to still another embodiment of the present invention.

FIG. 8 is a cross-sectional view of a secondary battery according to still another embodiment of the present invention.

Referring to FIG. 8, in the secondary battery 500 according to still another embodiment of the present invention, an insulation member is not provided in the cap assembly 450, compared to the secondary battery 400 according to the previous embodiment.

Since a coating layer 451 formed on a bottom surface of the cap plate 151 is made of an insulating material, a separate insulation member is not necessarily provided. Therefore, the secondary battery 500 according to this embodiment may have an increased coupling force with respect to an insulation bag 160 by the coating layer 451 formed on a bottom surface of the cap plate 151 without a separate insulation member, thereby reducing the number of components while maintaining stability. In addition, since the coating layer 451 is formed to a desired thickness, the overall thickness can be reduced, compared to using an insulation member, thereby facilitating an increase in the battery capacity.

Hereinafter, a secondary battery according to still another embodiment of the present invention will be described.

Figure 9:
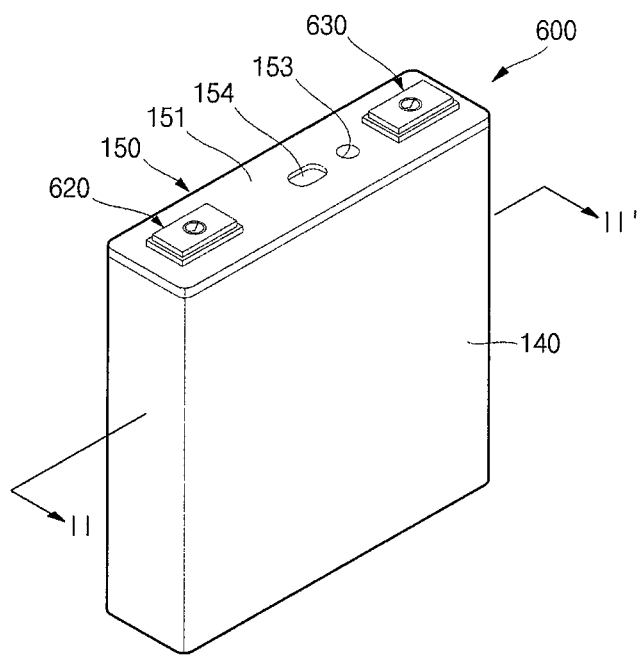
FIG. 9 is a perspective view of a secondary battery according to still another embodiment of the present invention.
Figure 10:
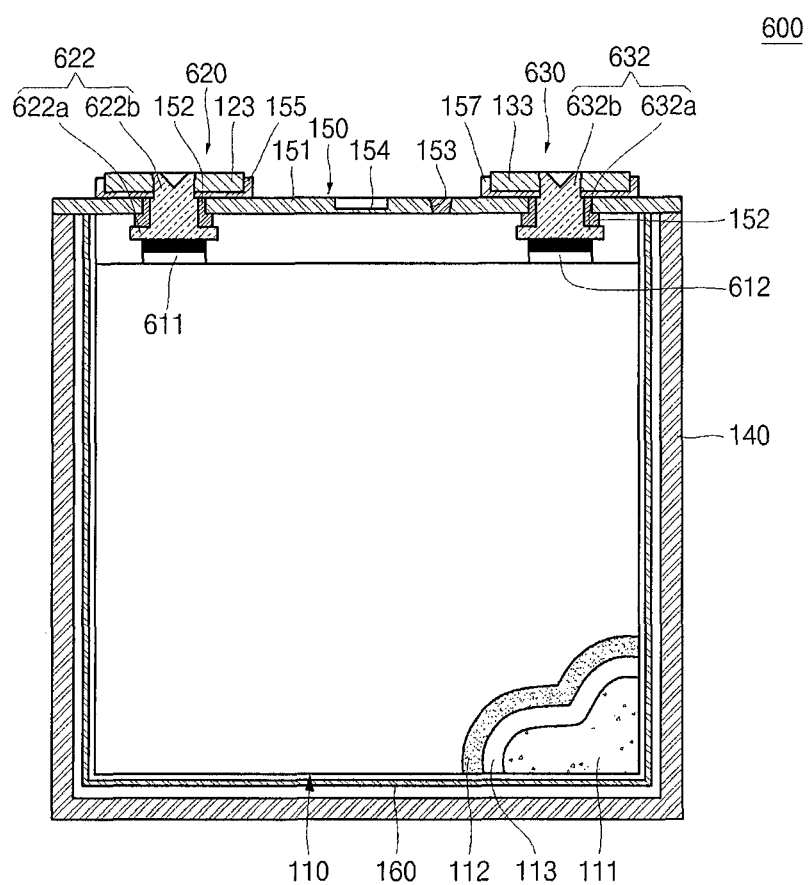
FIG. 10 is a cross-sectional view taken along the line II-II' of FIG. 9.
Figure 11A:
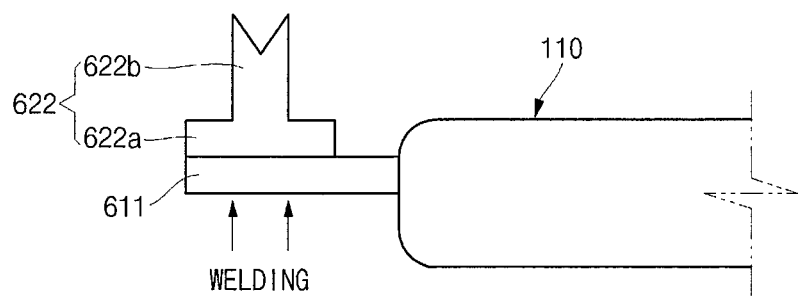
FIGS. 11A and 11B are side views illustrating that an electrode assembly and a first terminal assembly are coupled to each other in a secondary battery according to still another embodiment of the present invention.
Figure 11B:
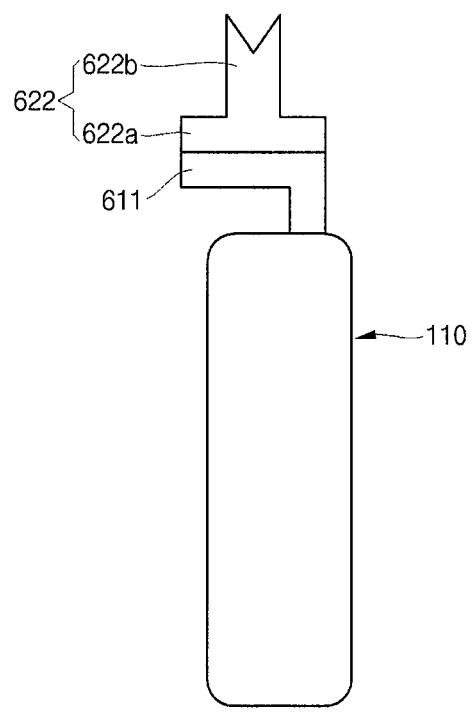
Figure 12:
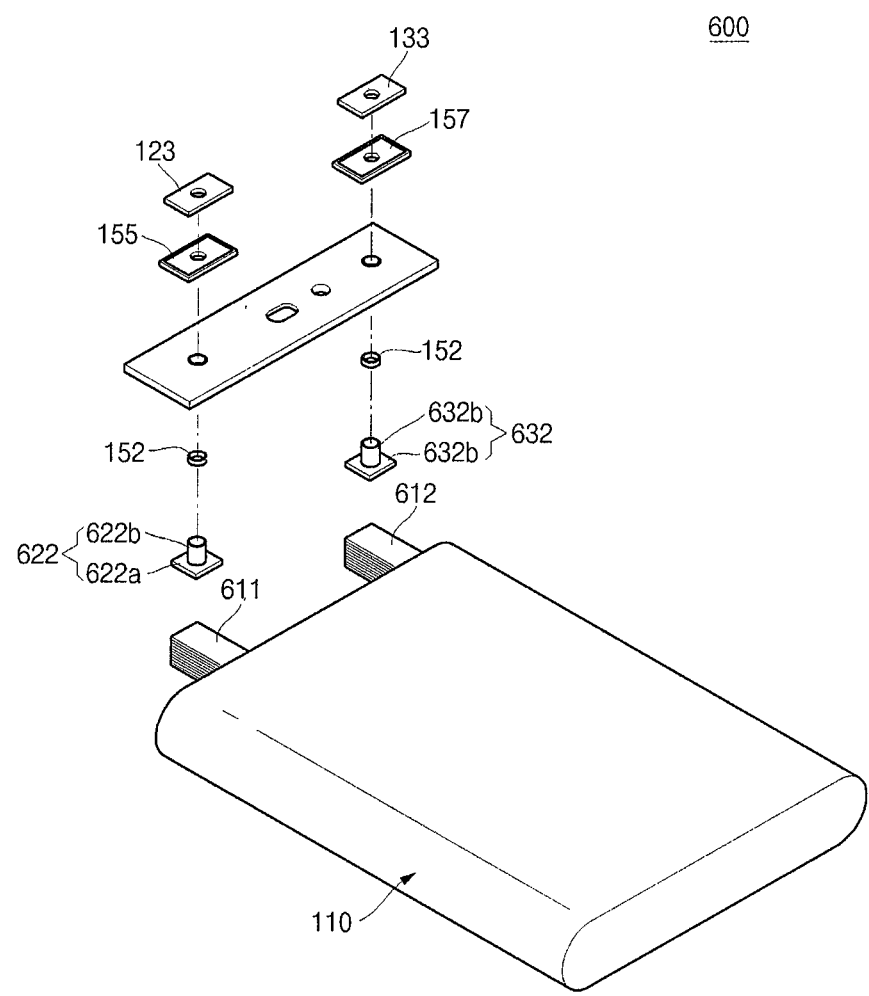
FIGS. 12 and 13 are exploded perspective views of a secondary battery according to still another embodiment of the present invention.
Figure 13:
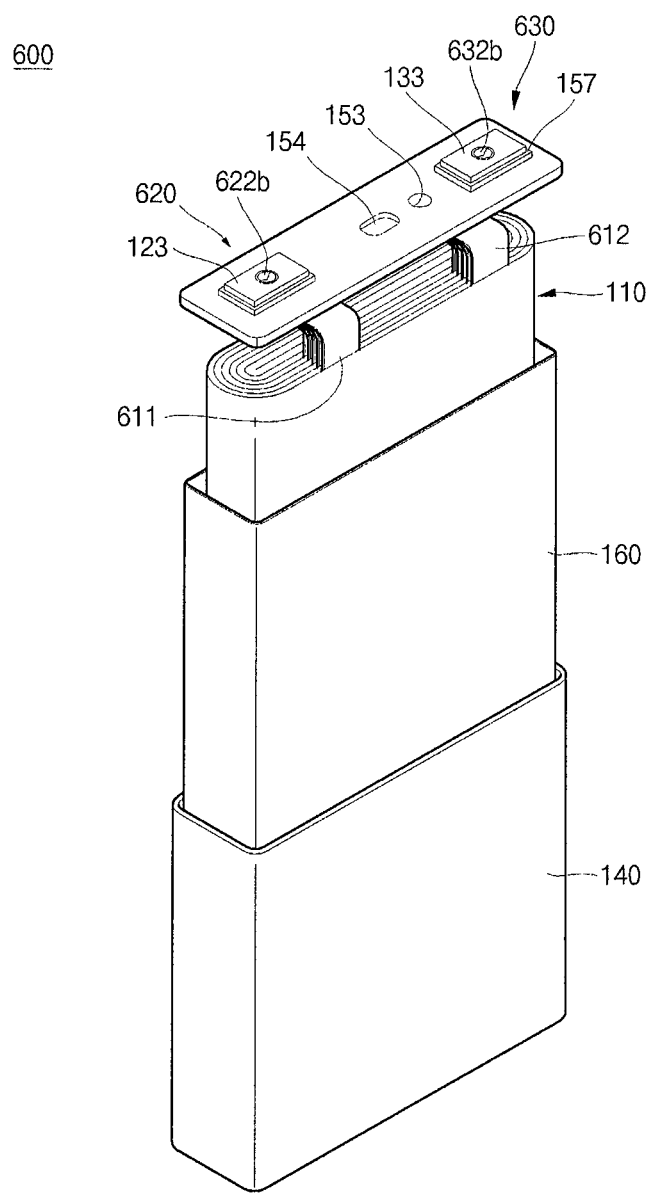

FIG. 9 is a perspective view of a secondary battery according to still another embodiment of the present invention, FIG. 10 is a cross-sectional view taken along the line II-II' of FIG. 9, FIGS. 11A and 11B are side views illustrating that an electrode assembly and a first terminal assembly are coupled to each other in a secondary battery according to still another embodiment of the present invention, and FIGS. 12 and 13 are exploded perspective views of a secondary battery according to still another embodiment of the present invention.

Referring to FIG. 9, the secondary battery 600 according to still another embodiment of the present invention includes an electrode assembly 110, current collector tabs 611 and 612, a first terminal assembly 620, a second terminal assembly 630, a case 140, a cap assembly 150 and an insulation bag 160.

The current collector tabs 611 and 612 may be integrally formed (e.g., integral) with electrode plates 111 and 112 of the electrode assembly 110. In more detail, the current collector tabs 611 and 612 may upwardly protrude from the electrode plates 111 and 112 when the electrode plates 111 and 112 are formed. In addition, when the electrode plates 111 and 112 are wound, the current collector tabs 611 and 612 are spaced (e.g., spaced a predetermined distance) apart from each other along the electrode plates 111 and 112 so as to overlap with the electrode plates 111 and 112 (e.g., overlap with the electrode plates 111 and 112 at predetermined locations). Accordingly, the current collector tabs 611 and 612 are integral with the electrode plates 111 and 112 and are respectively drawn from the wound electrode plates 111 and 112, and as such current collecting efficiency of the electrode assembly 110 can be increased. However, the current collector tabs 611 and 612 may also be separate members from the electrode plates 111 and 112 as one skilled in the art would appreciate.

The first terminal assembly 620 is coupled to the current collector tab 611 of the current collector tabs 611 and 612. Referring to FIG. 11A, the first terminal assembly 620 may be coupled to the current collector tab 611 in a state in which the current collector tab 611 is coupled to a bottom portion of first terminal assembly 620. In a state in which the current collector tab 611 is vertically stacked, it is coupled to the bottom portion of first terminal assembly 620. Accordingly, during charging and discharging, the current collected from the electrode assembly 110 or the current flowing toward the electrode assembly 110 moves to the first terminal assembly 620. Referring to FIG. 11B, after the coupling of the first terminal assembly 620, the current collector tab 611 is bent approximately 90 degrees. Therefore, the first terminal assembly 620 may be positioned vertically above the electrode assembly 110 and may be coupled to the cap plate 150.

The first terminal assembly 620 includes a first collector terminal 622 and a first terminal plate 123.

The first collector terminal 622 is coupled to the first current collector tab 611 and passes through the cap plate 151 to then upwardly protrude and extend (e.g., extend a predetermined length). The first collector terminal 622 includes a flange 622a horizontally extending from the electrode assembly 110 and a riveting part 622b upwardly protruding from the flange 622a. In addition, according to the choice made by one skilled in the art, when the first collector terminal 622 is coupled to the first terminal plate 123, a coupling part may further be welded along the edge of the riveting part 622b. in addition, a fastening plate 155 may be formed between the first terminal plate 123 and the cap plate 150, and the first terminal plate 123 and the cap plate 150 may be electrically connected to or insulated from each other according to the material of the fastening plate 155.

The second terminal assembly 630 includes a second collector terminal 632 and a second terminal plate 133. The second collector terminal 623 may also include a flange 523a connected to the second current collector tab 612 and a riveting part 623b connected to the flange 623a. According to the choice made by one skilled in the art, when the second collector terminal 623 is coupled to the second terminal plate 133, a coupling part may further be welded along the edge of the riveting part 623b.

Since the configuration and connection mechanism of the second collector terminal 632 and the second terminal plate 133 are substantially the same with those of the first collector terminal 622 and the first terminal plate 123 of the first terminal assembly 620, detailed descriptions thereof will be omitted.

Although the secondary battery according to exemplary embodiments of the present invention have been described in detail hereinabove, it should be understood that many variations and modifications of the basic inventive concept herein described, which may appear to those skilled in the art, will still fall within the spirit and scope of the present invention as set forth in the following claims and their equivalents.

What is claimed is:

1. A secondary battery comprising:
a case having an opening;
an electrode assembly in the case with an electrolyte;
a cap assembly comprising a cap plate sealing the opening of the case;
a terminal assembly electrically connected to the electrode assembly and protruding through the cap plate;
an insulation bag between the electrode assembly and the case to receive the electrode assembly and to hermetically seal the electrolyte, the insulation bag having an opening at a top end of the insulation bag for receiving the electrode assembly, and a flange at the top end of the insulation bag extending horizontally outward from an outer surface of the insulation bag; and
an insulation layer between an inner surface of the case and the insulation bag,
wherein the insulation layer is an air layer spacing the outer surface of the insulation bag apart from the inner surface of the case,
wherein the insulation bag contacts a bottom surface of the cap assembly, and
wherein the flange of the insulation bag is coupled to the cap plate.

2. The secondary battery of claim 1, wherein the flange of the insulation bag is coupled to a bottom surface of the cap plate by at least one of thermal compression, chemical bonding and use of an adhesion member.

3. The secondary battery of claim 1, wherein the insulation bag comprises at least one of polyethylene (PE), polypropylene (PP), polyethylene terephthalate (PET), or a combination thereof.

4. The secondary battery of claim 1, wherein hermetically sealing the electrolyte inside the insulation bag prevents the electrolyte from being brought into contact with the case.

5. The secondary battery of claim 1, wherein the insulation bag receives a region of the terminal assembly exposed to a bottom surface of the cap plate and seals an exposed region.

6. The secondary battery of claim 1, wherein the insulation bag is shaped as a hexahedron.

7. The secondary battery of claim 1, wherein the insulation bag has lower region protruding downwardly.

8. The secondary battery of claim 1, wherein the cap plate further comprises a coating layer on its bottom surface wherein the coating layer comprises an insulating material.

9. The secondary battery of claim 8, wherein the coating layer is adhered to the insulation bag to achieve coupling.

10. The secondary battery of claim 8, wherein the coating layer and the insulation bag are made of a same material.

11. The secondary battery of claim 8, wherein the coating layer comprises at least one of polyethylene (PE), polypropylene (PP), polyethylene terephthalate (PET), or a combination thereof.

12. The secondary battery of claim 1, further comprising a current collector tab protruding to one side of the electrode assembly, wherein the terminal assembly is coupled to the current collector tab.

13. The secondary battery of claim 12, wherein the current collector tab comprises a plurality of current collector tabs protruding from the inside of the electrode assembly and positions of the respective protruding current collector tabs are aligned.

14. The secondary battery of claim 12, wherein the current collector tab is integral with the electrode assembly or is coupled to the electrode assembly by a separate member.

* * * * *